Nov. 17, 1936.  K. JANISZEWSKI  2,061,403
DIE
Filed Jan. 14, 1935
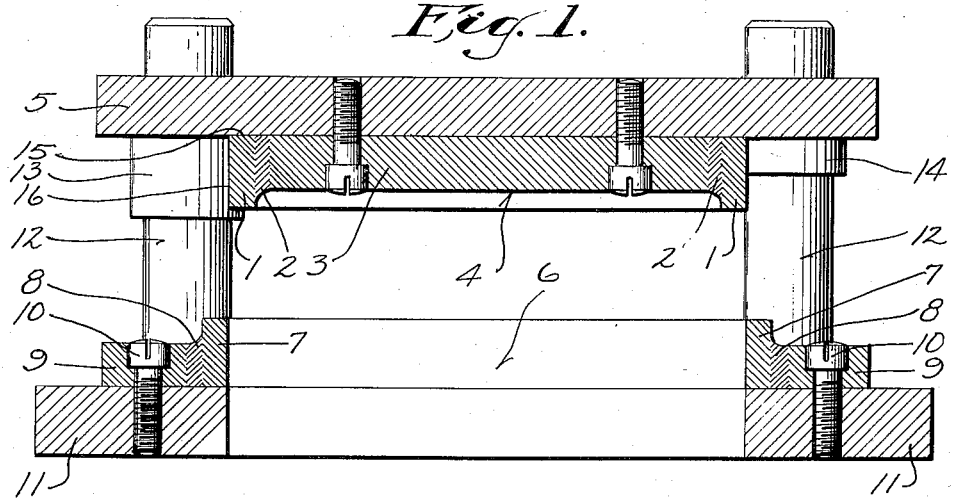
Fig. 1.
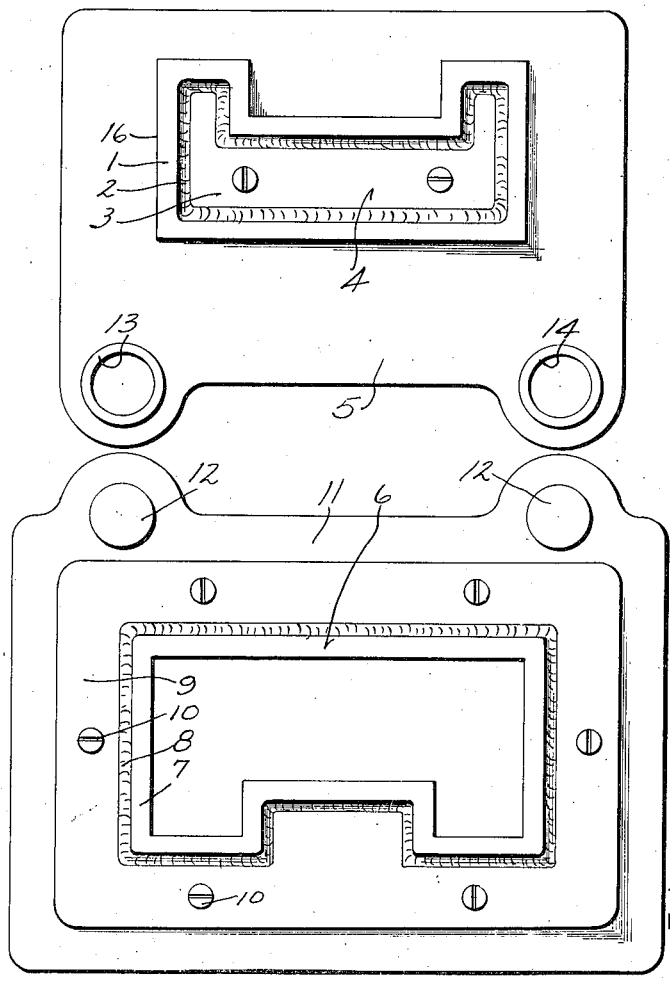
Fig. 2.
Fig. 3.
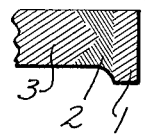
Fig. 4.
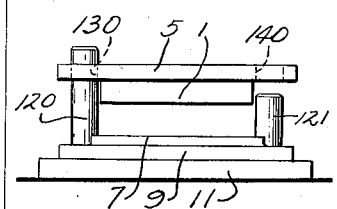
INVENTOR
Kasimir Janiszewski
BY Wheeler, Wheeler and Wheeler
ATTORNEYS Patented Nov. 17, 1936

2,061,403

UNITED STATES PATENT OFFICE 2,061,403

DIE

Kasimir Janiszewski, Milwaukee, Wis.

Application January 14, 1935, Serial No. 1,703

12 Claims. (Cl. 164—29)

This invention relates to dies and processes of manufacture thereof.

It is the object of the invention to provide an inexpensive die which will be equal in quality to the best available die but will be easier to manufacture and will combine the merit of a tool steel cutting edge with the qualities of a machine steel backing which enables the composite die of this invention to take a set under pressure for the correction of such warping as occurs in the hardening of all dies. In the case of a homogenous tool steel die such warping or deformation as occurs during hardening may be corrected only by expensive grinding operations, if at all. Thus, it is the object of the present invention to provide at greatly reduced cost a die which will have all of the advantages and none of the disadvantages of prior art dies.

More specifically, it is a primary object of this invention to provide in a new and improved form means whereby the actual die element is cut from tool steel with a torch and so welded to a machine steel mounting that adequate support will be maintained while exposing the machined die element for direct transmission of pressure from the press to the work.

It is a further object to provide means whereby the worn or otherwise defective portions of a die can be removed from the body of the die by cutting away such portions with a torch under water or by other means, and substituting the replacement in the body of the die without rehardening the cutting face.

It is a further object of the invention to provided means to facilitate the assembly of a die set by an arrangement such that one of the pins guiding the punch plate with reference to the die shoe is fully engaged before the other, due either to the length of the pin or to a bushing receiving the pin, thus eliminating sticking and binding and making it possible to assemble and disassemble the die set without the usual hammer blows.

In the drawing:

Figure 1 is a cross section through a novel composite punch and die and mounted in a die set including my improved assembly and disassembly feature.

Figure 2 is an plan view of the same composite punch and die mounted on a die set showing complementary faces.

Figure 3 is a fragmentary cross section showing a modification for use where the weld is deep.

Figure 4 is a front elevation on a reduced scale showing a slightly modified embodiment of the die set assembly feature.

Like parts are identified by the same reference characters throughout the several views.

In describing my invention, an examination of Figures 1 and 2 discloses a tool steel punch 1 of any desired shape suitably welded at 2 to a softer machine steel mounting plate 3, thus forming my composite male die member 4. The mounting surfaces of the punch 1, weld 2, and mounting plate 3, are held flush with the die set face 5 and are secured thereto in the usual manner. It is to be noted that the punch member 1 has the general shape in cross section of a bar with its upper face 15 exposed to the face of the die set for pressure contact while its working face 16 is of a form and dimension complementary to a female die member, later to be described.

Similarly, a tool steel die 7 is welded at 8 in its mounting 9 to form the composite female die member 6. Member 6 is secured by screws 10 to the die shoe 11. Die shoe 11 conventionally carries two substantially parallel vertically rising dowel pins 12. Punch holder 5 is further provided with suitable bushings 13 and 14 to receive the pins 12 and to cooperate therewith to guide the punch 4 into registry with the die 6.

It is to be noted that bushing 13 is very materially longer than bushing 14. Thus, the dowel pin 12 which is shown at the left in Figures 1 and 2 may be fully engaged with bushing 13 so that the mounting plate 5 for the punch die will be guided by said dowel pin before the other dowel pin requires engagement with its bushing 14.

The guidance afforded by the pin which is first engaged assures the smooth engagement of bushing 14 with the other pin so that the die set may be assembled and disassembled without any sticking whatever. This eliminates the destructive hammering which has heretofore been used to assemble and disassemble sticking die sets.

In Figure 4 I have shown an arrangement which operates similarly, although the bushings 13 and 14 are eliminated. In this construction one of the guide pins 120 is longer than the other guide pin 121 so that it is fully engaged in the aperture 130 of the mounting plate 5 to guide the assembly of the die set before the other pin 121 is received into the aperture 140.

In the actual production of the male die member 1, a sheet of tool steel is cut to produce an endless ring in the form of a closed geometrical figure, each side thereof having a bar-like cross section, the outside contour of which is slightly larger and of similar shape to the finished female die member.

Similarly, the female die member 7 is cut from a sheet of tool steel to produce an endless ring in the form of a closed geometrical figure, each side of which has a bar-like cross section, the inside of which is slightly smaller than the actual finished blank which it is to produce.

In practice, the cutting of the tool steel is done with a torch. The torch employed in the above operation can be used with great accuracy, so that a minimum of working is required to reduce the cutting edges to the proper form.

The operating die members 1 and 7 are then welded to soft iron or machine steel mountings 3 and 8 which have been torch cut closely to the peripheral form of the die members which they are to support. Any type of weld may be applied, such as oxy-acetylene or electrical means, to join the sides of the die members to the mountings. This weld gives to both members their required character essential to their further operation as a cutting die or punch.

In Figure 3 I show a beveled mounting 3 for deep welds, rather than the straight sides disclosed in the previous views. This modification will be fully appreciated by those skilled in the weldng art.

It is essential that one of each of the bar faces 1 and 7 and the faces of their respective mounting plates 3 and 9 be held flush with the die set faces and the weld can be so applied to permit that condition. When completed, the die members 4 and 6 have a relatively soft steel mounting portion and a tool steel cutting edge integrally joined.

The cutting edges of members 4 and 6 are then machined to the required dimensions as is done in any conventional die, the advantage being that a minimum amount of stock is provided to be removed by virtue of the torch method of cutting.

A heat treatment is then provided to the composite die members 4 and 6 which causes the portion 1 of member 4 and the portion 7 of member 6 to become hard. The portion 3 of member 4 and the portion 9 of member 6 will remain soft.

The constructions herein disclosed have many advantages. In the first place, the cutting of the tool steel by means of a torch is an extremely economical process and is productive of considerable savings of material as compared with any other cutting method.

In the second place, the fact that the die elements and their respective mounting plates are only in peripheral engagement instead of being welded together face to face eliminates warpage and cracking during the first or any subsequent number of heat treatments. But for this feature the greater contraction of the machine steel during the hardening process would produce warpage and a tendency of the device to crack at the weld.

In the third place, dies made in accordance with this invention are not limited to light gauges of metal, as would be the case if the machine steel underlaid the tool steel. In my construction the shock of stamping is carried from the die set or press base directly through the two hardened tool steel portions of the die, thus permitting the stamping of any gauge of material without such damage as would result from the transmission of these shocks through the machine steel.

In the fourth place, my improved die construction permits of the correction of any change of form which unavoidably occurs, in some cases, in hardening. The composite die will not break when contracted or expanded under circumstances which would break a die of solid tool steel.

In the fifth place, the composite die may be altered by removing a section of the tool steel member, either by grinding or by the use of a torch, or otherwise, the removed portion being replaced by a redesigned new section secured by means of screws or dowels, thereby salvaging the die at extremely low cost without annealing or rehardening.

Finally, dies made in accordance with this invention have been found to cost substantially less than half as much as the conventional solid tool steel punches and dies heretofore used.

The advantages derived from the use of the die set assembly with pins and sockets of differing length will be clear to the skilled operator, and are too well demonstrated in actual practice to require further explanation.

I claim:

1. A die set comprising complementary die carrying members and pin and socket means at spaced points for guiding said members with reference to each other, one of said pin and socket means being engageable in advance of the other, whereby to guide said members in the engagement of said other pin and socket means.

2. In a die set, the combination of a pair of die carrying members, one of which is provided with a plurality of spaced socket means and the other of which is provided with a plurality of complementary spaced pin means, one of said means being elongated as compared with the other like means, whereby one of said pins will engage one of said sockets in advance of the engagement of any other pin with any other socket.

3. In a die set, the combination with a socketed die carrying member, of a second die carrying member provided with pins registerable with the sockets of the first die carrying member, one of said pins being longer than another of said pins, whereby to engage the corresponding socket for the guidance of the other pin in its movement to its socket.

4. In a die set, the combination with a die carrying member provided with guide pins, of a second die carrying member provided with bushings registerable with said pins, one of said bushings being elongated as compared with another of said bushings, whereby the elongated bushing may be engaged with its pin to guide said other bushing in the engagement thereof with its pin.

5. In a die, a tool steel member having the outline of a closed geometric figure and having spaced surfaces exposed respectively for press engagement and work engagement, together with a mounting member of softer metal joined to one side of the tool steel member throughout the periphery thereof and only slightly less in thickness than the tool steel member, the cutting margin of said tool steel member being continuous and having an undistorted and substantially uniform grain throughout its extent.

6. A die of the class described including a tool steel member having the outline of a closed geometric figure and having spaced surfaces adapted for press engagement and work engagement, and a mounting member of softer metal joined to one side of said tool steel member throughout the periphery thereof, said mounting member having a press engaging surface substantially in alignment with the press engaging surface of the steel member whereby working pressure is simultaneously and uniformly applied to the press engaging surfaces of said members.

7. A die comprising a tool steel member in the form of a closed geometric figure with an open center and having a flat upper press face and a lower working face, and a soft steel mounting member peripherally welded to said tool steel member and having a press face substantially flush with the press face of the steel member whereby working pressure is simultaneously and uniformly applied to the press faces of said members.

8. A die comprising a tool steel member in the form of a closed geometric figure with an open center and having a broad flat upper press face and a lower working face, and a soft steel mounting member peripherally welded to said tool steel member and having a press face disposed in the same plane as the press face of the steel member whereby working pressure is simultaneously and uniformly applied to the press faces of said members, said mounting member being thinner than said steel member so as to expose the working face of the steel member.

9. A die having in combination a tool steel member provided with substantially parallel upper and lower surfaces, a soft steel mounting member having its upper surface substantially flush with the upper surface of the steel member and welded to said tool steel member at one of its sides, a press associated with the die and engaging the upper surfaces of said members whereby to apply operating pressure simultaneously and uniformly to the members.

10. A composite die comprising a tool steel member having the outline of a closed geometric figure and having spaced surfaces adapted for press engagement and work engagement, the latter having a continuous and homogeneous shearing margin, and a mounting member of softer metal joined to one side of said tool steel member throughout the periphery thereof, said mounting member also having a press engaging surface.

11. A composite die comprising a tool steel member in the form of a closed geometric figure with an open center and spaced surfaces adapted for press engagement and work engagement, the latter having a continuous and homogeneous shearing edge, in combination with a soft steel mounting member having a cross section at least substantially equal to that of said tool steel member and not greatly less in thickness than said tool steel member, said soft steel member being peripherally secured to said tool steel member, whereby to leave both of said faces exposed and to resist lateral pressure on said shearing edge.

12. A composite die comprising the combination with a tool steel member in the form of a closed geometric figure with an open center having inner and outer peripheral sides and spaced surfaces adapted for press engagement and work engagement, the latter having a continuous and homogeneous shearing edge along one of said peripheral sides, of a soft steel mounting member peripherally reinforcing the tool steel member along the side opposite said edge, said mounting member also having a press engaged face and an opposite face closely spaced adjacent the plane of said edge, whereby to resist lateral pressures developed in the shearing use thereof.

KASIMIR JANISZEWSKI.